United States Patent
Rögner

(10) Patent No.: US 8,066,492 B2
(45) Date of Patent: Nov. 29, 2011

(54) DRIVE DEVICE FOR THE OIL PUMP OF A MOTOR VEHICLE TRANSMISSION

(75) Inventor: Horst Rögner, Oberteuringen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 654 days.

(21) Appl. No.: 12/280,089

(22) PCT Filed: Feb. 12, 2007

(86) PCT No.: PCT/EP2007/051305
§ 371 (c)(1),
(2), (4) Date: Aug. 20, 2008

(87) PCT Pub. No.: WO2007/096258
PCT Pub. Date: Aug. 30, 2007

(65) Prior Publication Data
US 2009/0022608 A1    Jan. 22, 2009

(30) Foreign Application Priority Data
Feb. 23, 2006   (DE) .................. 10 2006 008 430

(51) Int. Cl.
*F04D 13/06* (2006.01)

(52) U.S. Cl. .......... 417/17; 417/223; 417/316; 417/374; 477/5

(58) Field of Classification Search .............. 417/17, 417/223, 316, 364, 374; 475/5, 149, 150; 477/5, 6; 180/65.21–65.7; 290/40 C, 54, 290/43; 74/731.1, 732.1, 730.1; 192/41 R–41 A
See application file for complete search history.

(56) References Cited

U.S. PATENT DOCUMENTS

| | | | | |
|---|---|---|---|---|
| 5,427,196 A * | 6/1995 | Yamaguchi et al. | ........ | 180/65.21 |
| 5,474,428 A * | 12/1995 | Kimura et al. | ................ | 417/16 |
| 6,350,108 B1 * | 2/2002 | Haupt | .................... | 417/364 |
| 6,763,797 B1 * | 7/2004 | Staley et al. | ............... | 123/196 R |
| 6,863,140 B2 * | 3/2005 | Noreikat et al. | ........... | 180/65.23 |
| 7,413,417 B2 * | 8/2008 | Klaus et al. | ................. | 417/366 |
| 7,421,928 B2 * | 9/2008 | Klaus et al. | ................. | 74/606 R |
| 7,730,982 B2 * | 6/2010 | Hidaka et al. | ........... | 180/65.265 |
| 2004/0161340 A1 | 8/2004 | Rimkus et al. | | |

FOREIGN PATENT DOCUMENTS

| | | |
|---|---|---|
| DE | 197 50 675 C1 | 8/1998 |
| DE | 100 12 385 A1 | 9/2001 |
| DE | 101 60 466 C1 | 6/2003 |
| DE | 600 02 133 T2 | 10/2003 |
| DE | 102 51 041 A1 | 5/2004 |
| DE | 103 11 270 A1 | 9/2004 |
| EP | 1 069 311 B1 | 6/2000 |
| EP | 1 484 532 A2 | 12/2004 |
| GB | 2 273 323 A | 6/1994 |

* cited by examiner

*Primary Examiner* — Devon C Kramer
*Assistant Examiner* — Ryan Gatzemeyer
(74) *Attorney, Agent, or Firm* — Davis & Bujold, P.L.L.C.

(57) ABSTRACT

A drive device (2) for the oil pump (6) of a motor vehicle automatic transmission, in which the oil pump (6) on the one hand can be coupled to the drive motor by way of an overrunning clutch (34) and on the other hand is drivingly connected to an auxiliary electric motor (22), which is powered by the on-board power supply of the motor vehicle. The electric motor (22) is arranged outside of the pump housing (8) and is drivingly connected to a driven pump impeller wheel (ring gear 10) that is arranged in the pump housing via a non-rotatable connection.

14 Claims, 3 Drawing Sheets

DRIVE DEVICE FOR THE OIL PUMP OF A MOTOR VEHICLE TRANSMISSION

This application is a national stage completion of PCT/EP2007/051305 filed Feb. 12, 2007, which claims priority from German Application Serial No. 10 2006 008 430.6 filed Feb. 23, 2006.

FIELD OF THE INVENTION

The present invention relates to a drive device for the oil pump of a motor vehicle transmission.

BACKGROUND OF THE INVENTION

Automatic transmissions require an oil pump both for lubrication and for supply of control and actuation equipment, to supply the necessary quantity of oil and oil pressure in all operating states.

In older designs, the oil pump is generally directly or indirectly drive-connected to the drive motor so that the rotational speed, and consequently the pumping capacity of the oil pump, usually configured as a fixed displacement pump, are proportional to the rotational speed of the drive motor. In order to ensure the pumping capacity required to operate the transmission when a drive motor is idle, the oil pump is designed for the idling speed of the drive motor. This means that at higher rotational speeds of the drive motor, the oil pump will supply a multiple of the required quantity. Because of this, oil pumps of this type draw too much power, tend towards cavitation and produce relatively intense operating noise. Apart from that, the duct cross-sections have to be highly over-dimensioned. A further disadvantage is that no pumping capacity is available when the drive motor is halted so that the transmission is inactive and cannot be preconditioned for upcoming functions.

In order to meet steadily growing requirements on the transmission for spontaneity, comfort, and wear reduction, it has therefore already been recommended that in addition to the main oil pump driven by the drive motor, an electrical auxiliary oil pump is provided which supplies the necessary oil to the transmission even when the drive motor is stopped and supports the main oil pump when the drive motor is running at low rotational speeds. However, this represents a considerable design and construction effort as apart from the electric drive, a second pump, a connection of this pump to the existing hydraulic circuit, as well as a separate sensor system for switching the auxiliary oil pump is required. In addition, the accommodation of these additional components in the given installation spaces is often problematic.

From DE 197 50 675 C1, a drive device is well known in which the single oil pump is driven by an electric motor when the motor is idle or running at rotational speed below a given threshold, but above this threshold by the vehicle drive motor itself. In this known design, the electric motor and the oil pump are each arranged concentrically to one another and to the input shaft in a common housing, the oil pump is configured as a ring gear pump with a driven ring gear. The secure drive connection, between the electric motor rotor and the ring gear of the oil pump, is implemented such that the rotor and the ring gear are configured as an integrated component. Since the electric motor rotor is located inside the pressure compartment of the pump, tribologic problems arise at the external diameter of the internal ring gear, functioning as a slide bearing, due to the necessary enlargement of the ring gear, and variations in the seal gap occur during the temperature cycles owing to the pairing of different materials in the pump pressure compartment. In addition, when the materials of pump components are selected, their effect on the properties of the auxiliary electric drive has to be kept in mind, which restricts the choice of materials.

From DE 101 60 466 C1 a drive device is indeed known, but the stator and rotor of the electric motor are arranged outside of the pump housing. However, the drive connection, between the electric motor rotor and the driven internal gear of the internal gear pump, is not fixed, but is by way of a separate sheath-like connecting section that is rotatably mounted on the input shaft and is fixedly connected to the internal gear, and can be coupled to the input shaft and to the electric motor rotor, via a separate overrunning clutch. This arrangement does ensure the decoupling of both drive systems from one another in such a manner that the correspondingly inactive drive system need not be carried along by the active drive system, but it is relatively complicated in terms of construction and design owing to the additional overrunning clutch as well as to the connecting section joining the rotor located outside of the pump housing to the gear wheel inside the pump housing.

Against this background, the object of the present invention is to create a drive device, which is simple in design and construction and does not feature the disadvantages described above in connection with the electric motor disposed inside the pump housing.

SUMMARY OF THE INVENTION

The present invention is based on the knowledge that even if the rotor of the electric motor is spatially separated from the driven pump impeller wheel of the oil pump, a fixed connection between these components is possible and reasonable, since design and construction simplification of the drive connection is achieved in this way.

Thus the invention is based on a drive device for the oil pump of a motor vehicle transmission, in particular an automatic transmission, in which the oil pump may be coupled by way of an overrunning clutch to the drive motor and is drive-connected to an auxiliary electric motor powered by the on-board power system. In order to achieve the set objective, it is therefore provided that the electric motor be arranged outside of the pump housing and be drive-connected via a non-rotatable drive connection to a driven pump impeller wheel arranged inside the pump housing.

By the arrangement of the electric motor outside of the pump housing, in particular the disadvantages described above in relation to DE 197 50 675 C1, are avoided so that tribologic problems, as well as changes in the seal gap during the temperature cycles, resulting from the pairing of different materials in the pressure compartment of the pump, are eliminated. Likewise, because of the spatial separation, the material selection of pump components does not affect the properties of the electric auxiliary drive.

Compared with the above-mentioned specification DE 101 60 466 C1, considerable design and construction simplifications result from the directly non-rotatable drive connection between the electric motor rotor and the driven pump impeller wheel of the oil pump, as a separate connecting section rotatably mounted on the input shaft, as well as a second overrunning clutch, is eliminated. As a result of the non-rotatable connection between the rotor and pump impeller wheel, the rotor even rotates when the electric auxiliary drive is inactive. This may optionally be useful, however, in that the electric auxiliary drive can be used as a generator during the mechanical drive phase of the oil pump.

According to a preferred embodiment of the invention, a drive device is provided in which the electric motor is arranged co-axially to the input shaft and features a rotor arranged radially on the inside. The electric motor is arranged in a separate electric motor housing, and in which the rotor is rotatably mounted in the electric motor housing and forms a hub extension, which encompasses the input shaft and is non-rotatably coupled via a mechanical drive connection to the oil pump or to a driven pump impeller wheel of the oil pump. In contrast to the connecting section of DE 101 60 466 C1, the hub extension does not have to be rotatably mounted with respect to the input shaft as it forms a component of the electric motor rotor and is rotatably mounted via the latter in the electric motor housing.

A further embodiment of the invention provides that the hub extension of the rotor may be coupled to a component driven by the drive motor by way of an overrunning clutch. This component should preferably be located in the drive train in front of an optionally available separating clutch or start-up clutch as it is also rotatably driven by the running drive motor when the clutch is disengaged.

According to a further embodiment of the present invention, the hub extension of the rotor may be coupled to the pump section of a hydrodynamic torque converter arranged between the drive motor and the transmission. In a constructional embodiment of this feature, it is provided that a hub sleeve, encompassing the input shaft and extending into the area of the electric motor is configured on the pump section of the hydrodynamic torque converter and that the overrunning clutch is arranged between the hub sleeve and the hub extension of the rotor.

An especially compact constructional solution in which the installation space provided by the hydraulic circuit of the hydrodynamic torque converter is utilized particularly advantageously, arises when the electric motor stator and rotor for the oil pump are arranged between the torque converter and the transmission inside a cover which is arranged on a front panel of the transmission and forms the electric motor housing, as will be explained in more detail by way of an exemplary embodiment.

A further advantageous embodiment of the invention in the sense of a compact design provides that the oil pump be configured as a ring gear pump which has a driven ring gear, is co-axially disposed with respect to the input shaft and comprises a pump housing axially adjacent to the electric motor housing and that the hub extension of the rotor penetrates the pump housing in a sealing manner via an opening of the pump housing that surrounds the transmission output shaft co-axially and is non-rotatably connected to the ring gear of the oil pump via a gearing or the like.

According to a further embodiment of the invention, the entire oil pump may also be arranged inside the cover forming the electric motor housing.

A further advantageous embodiment of the present invention in the sense of a compact design provides that the oil pump be configured as a vane pump that is co-axial with the input shaft, has a driven ring gear (FZP-rotor) and is arranged on the side of the transmission opposite the combustion engine or the front panel of the transmission. The drive shaft of this vane pump, connected to the internal combustion engine, passes through the transmission in the axial direction, co-axially to the input shaft preferentially configured as a hollow shaft.

Similarly to the previously mentioned ring gear pump, an embodiment of this vane pump can provide that the pump housing be integrated into the back cover of the transmission or into the back wall of the transmission housing or directly abuts this cover or back wall and that the electric motor housing directly abut the pump housing or be integrated into the pump housing. Thus in this case, the electric motor as well as the pump are arranged on the transmission side opposite the combustion engine, optionally on the transmission side of the pump or on the pump side facing away from the transmission.

Another embodiment of the vane pump, arranged co-axially to the input shaft, provides that the pump itself be arranged in the side of the transmission opposite the combustion engine, with the pump input shaft to be run centrally through the transmission, that an active connection be provided between the pump drive shaft and the combustion engine, that an additional active connection be provided between the pump drive shaft and the electric motor and that this electric motor, viewed spatially, be disposed in an area close to the combustion engine, in the area of the front panel of the transmission, for example, co-axially to the input shaft. In this way the above-mentioned active connection, between the pump input shaft and the electric motor can feature a free wheel and, in the case, when the pump input shaft actively connected to the combustion engine runs centrally through the input shaft, it can have a magnetic or inductive torque transmission, for example, through the input shaft to be configured as a hollow shaft.

If required or permitted by the installation space available in the motor vehicle, according to a further development of the invention, the oil pump can be configured as a pump with its axis parallel to the input shaft, with a pump input shaft projecting from the pump housing, whereby the hub extension of the electric motor rotor is non-rotatably connected to the pump input shaft by way of a transmission. This arrangement makes it possible, for example, by selecting the transmission ratio in the transmission, to optimize the pump dimensions both when it is driven by the combustion engine, as well as when it is driven by the electric motor. Thus, with a speed increasing ratio, for example, the pump can have smaller dimensions, with the resultant advantages regarding the installation space, weight, costs and efficiency. The oil pump can have any type of configuration, for example, a vane pump configuration.

In order to achieve an especially compact design of the oil pump, it can be provided that the oil pump be integrated into the front panel of the transmission facing the combustion engine, whereby the oil pump is then fixed axially, via the electric motor housing, to the front panel of the transmission. However, it can also be provided that the oil pump be arranged inside the cover forming the electric motor housing, which is then non-torsionally connected to the front panel of the transmission.

The invention also comprises further embodiments of arrangements, for example an arrangement in which the electric motor is arranged axially parallel to an oil pump that is arranged co-axially to the transmission input shaft or an arrangement in which both the electric motor and also the oil pump are arranged axially parallel to the transmission input shaft, whereby the electric motor and the oil pump can be arranged co-axially or axially parallel to one another.

BRIEF DESCRIPTION OF THE DRAWINGS

The invention will now be described, by way of example, with reference to the accompanying drawings in which.

DETAILED DESCRIPTION OF THE INVENTION

Figure 1:
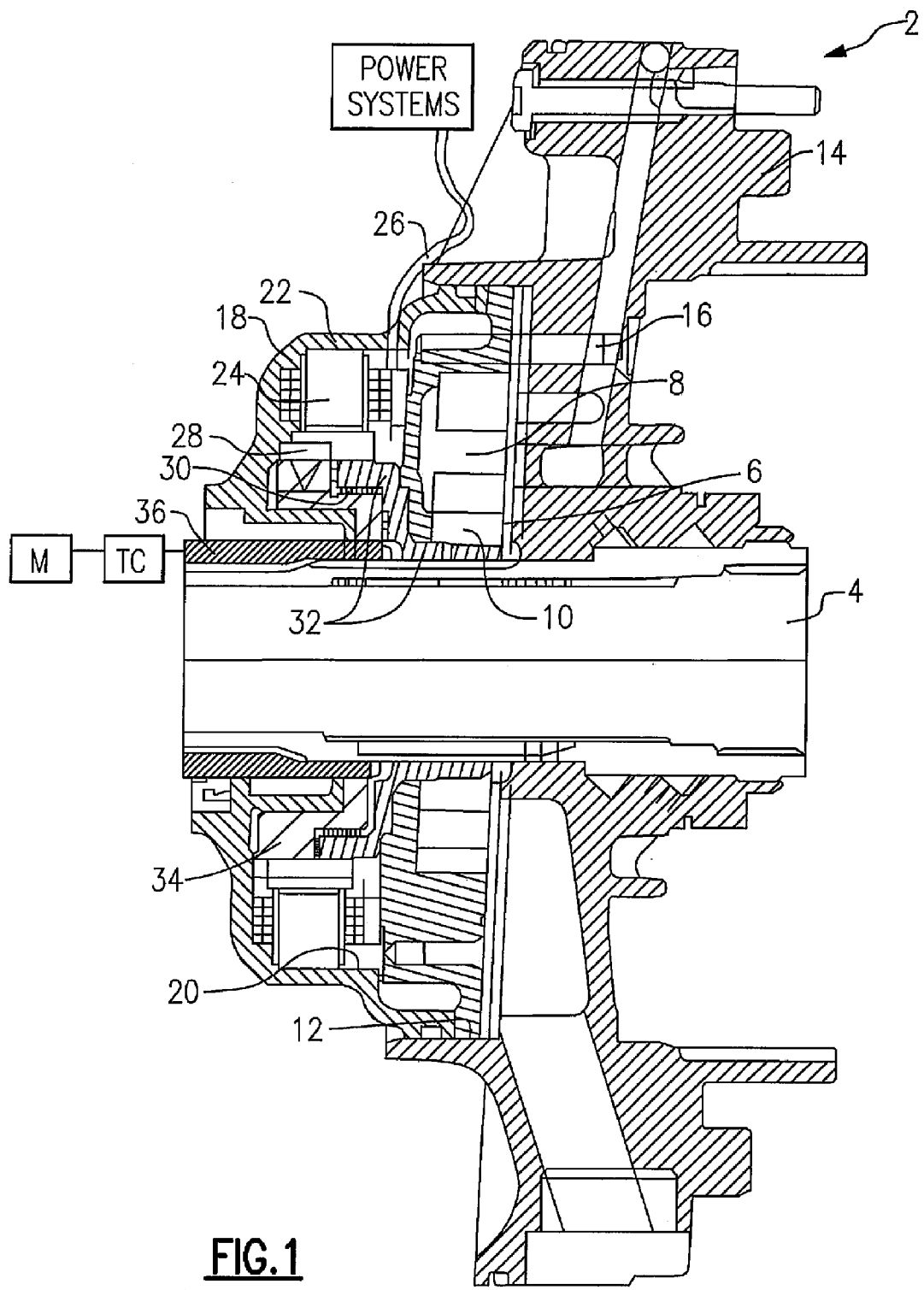
FIG. 1 is a longitudinal section through an exemplary drive device with an electric motor and an oil pump arranged co-axially to the transmission input shaft according to the present invention.

An exemplary drive device 2, according to the invention illustrated in FIG. 1, is used to drive an oil pump 6 arranged co-axially to an input shaft 4 of a transmission (not shown) for supplying lubricating and pressure oil to the transmission.

The oil pump 6 is configured as a conventional ring gear pump (not described in detail). It comprises a pump housing 8, a driven ring gear 10, and an internal ring gear (not shown) working jointly with it.

The oil pump 6 is arranged in an installation space 12, which is configured on the front panel 14 arranged on the front side of the transmission (not shown). The pump housing 8 is secured in the installation space 12 by way of mounting bolts 16.

The installation space 12 is engaged by a cover which forms an electric motor housing 18 and forms a further installation space 20 that axially abuts the installation space 12, in which the electric motor 22 is arranged co-axially to the input shaft 4 and to the oil pump 6.

The electric motor 22 comprises a stator 24 which is fixedly arranged in the electric motor housing 18, and which is powered by the electric on-board power system motor vehicle generator via a supply line 26. A rotor 28 is arranged radially inside the stator 24 and rotatably mounted in the electric motor housing 18 via a bearing 30 configured as a slide or ball bearing. The rotor 28 forms a hub extension 32 which encompasses the transmission input shaft 4 and is coupled non-rotatably to the driven ring gear 10 of the oil pump 6 via any mechanical drive connection, for example a gearing.

The hub extension 32 of the rotor can be coupled to a component driven by a drive motor via an overrunning clutch 34. The component driven by the drive motor of the exemplary embodiment, shown in FIG. 1, is formed by a hub sheath 36 encompassing the transmission input shaft 4 and extending into the region of the electric motor 22. It is configured, for example on the pump section, connected to the drive motor M, of a hydrodynamic torque converter TC (or on the engine side part of a mechanical clutch).

The overrunning clutch 34 is designed such that it permits rotation of the hub extension 32 relative to the stationary or slower running hub sheath 36, but creates a catching connection between both components when the rotational speed of the hub sheath 36 is higher than that of the hub extension 32.

The described drive device functions as follows: when the drive motor is halted or running at lower rotational speed, for example at an idle rotational speed or a speed slightly above idle, the oil pump 6 of the electric motor 22 is driven at rotational speed such that an adequate quantity of oil is ensured for the lubrication and operation of the transmission. When the drive motor reaches a speed at which the hub sheath 36 overtakes the hub extension 32, the overrunning clutch 34 engages so that the oil pump 6 is driven by the drive motor. At this moment, the current supply to the electric motor 22 is switched off. Since the rotor 28 is rotatably driven via the hub extension in this operation mode, the electric motor can then be operated as a generator.

The arrangement according to the invention makes it possible to keep gears engaged in the automatic transmission even when the drive motor is halted, which requires a certain oil pressure. Hence after the motor starts up, clutch filling times for the start-up gear are eliminated, which results in improved operational spontaneity of the vehicle drivetrain. Likewise, transmission cooling can be preserved, so that the transmission remains preconditioned for the subsequent start-up procedure. The electric drive of the oil pump thus makes it possible to advantageously drive the combustion engine with a start-stop functionality, without having to put up with delays during start-up. The potential for consumption and exhaust reduction potential is significant. A further advantage results from the possibility of tow-starting the drive engine.

The electric auxiliary drive may assume further functions when the drive motor is running as, for example actuating the parking lock cylinder, cooling the torque converter to prevent stationary heating or cooling a wet start-up clutch. With a suitably dimensioned electric motor, further functions are possible with fully hybrid transmissions, such as engaging the drive clutches during purely electromotive driving, cooling the start-up clutch during creeping motion or during the slip phase when the drive motor is started, etc.

Figure 2:
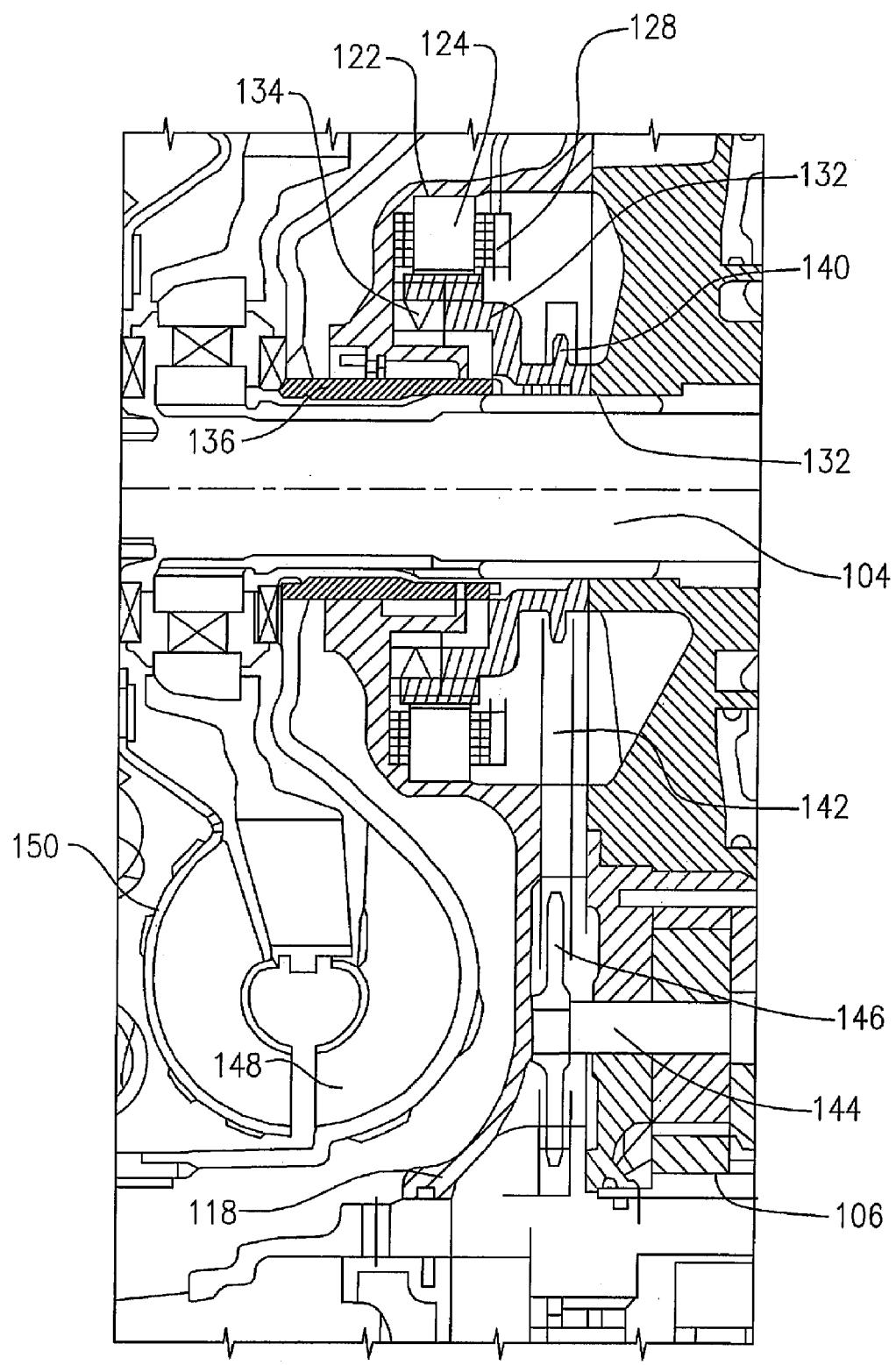
FIG. 2 is a longitudinal section through an exemplary drive device with an electric motor arranged co-axially to the transmission input shaft and an oil pump arranged axially parallel to the transmission input shaft according to the present invention.

FIG. 2 shows a partial longitudinal section of an exemplary drive device, according to the invention in which, in contrast with FIG. 1, an oil pump 106 arranged axially parallel to a transmission input shaft 104 is provided.

An electric motor 122 is configured similarly to FIG. 1 and comprises a stator 124 arranged in a cover forming an electric motor housing 118, and a rotor 128 that is rotatably mounted in the electric motor housing 118, on which a hub extension 132 encompassing the transmission input shaft 104 is configured. The hub extension 132 holds a sprocket wheel or a belt pulley 140, which is drive-connected non-rotatably by a chain or belt 142 to a sprocket wheel or a belt pulley 146 arranged on a pump input shaft 144 of the oil pump 106.

A hub sheath 136 encompassing the transmission input shaft 104 is configured on a pump section 148, non-rotatably connected to the drive motor, of a hydrodynamic torque converter 150 arranged between the drive motor and the transmission, the hub sheath 136 extending into the region of the electric motor 122. An overrunning clutch 134 is arranged between the hub sheath 136 and the hub extension 132 and, as in the example of FIG. 1, drives the hub extension 132 when the hub sheath 136 overruns the hub extension 132.

The function of the drive device, illustrated in FIG. 2, corresponds to the function described with reference to FIG. 1.

The present invention also comprises a further embodiment, which shall be explained in the example of FIG. 1. In this instance, the oil pump 6 arranged co-axially to the transmission input shaft 4 is driven by an electric motor (not shown), axially parallel to the transmission input shaft 4, which is fixedly drive-connected, via a chain or belt drive, to a hub extension similar to the hub extension 32. In this case, instead of the rotor designated with 28 in FIG. 1, a sprocket wheel or a belt pulley is provided, which is drive-connected to the electric motor, in a manner that need not be explained in detail. In other respects, and especially with regard to the design and arrangement of the oil pump 6, as well as the connection of the ring gear 10 to the hub extension 32 and the overrunning clutch 34, this design corresponds to the configuration shown in FIG. 1.

Figure 3:
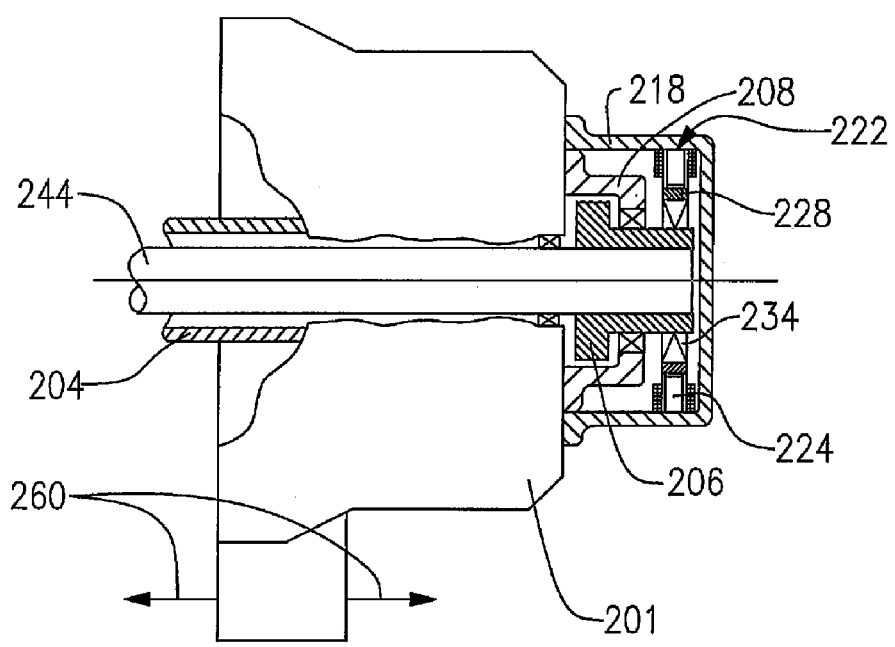
FIG. 3 is a schematic diagram of an exemplary transmission with drive device with an electric motor arranged co-axially to the transmission input shaft and a co-axially arranged oil pump, both of which are arranged on the side of the transmission opposite the drive motor of the transmission according to the present invention.

FIG. 3 shows a greatly simplified schematic diagram of an exemplary transmission with a drive device with an electric motor arranged co-axially to the transmission input shaft and co-axially diposed oil pump, whereby the electric motor and oil pump are arranged on the side of the transmission that is opposite the drive motor of the transmission. This arrangement is especially suitable for a vehicle with a front-transverse drive, in which the drive motor and transmission are arranged transversally to the direction of motion of the vehicle, but also for a motor vehicle with front-longitudinal or rear-longitudinal drive, in which the drive motor is arranged longitudinally to the direction of motion of the vehicle and the transmission features a differential. The exemplary transmission, illustrated in FIG. 3, is provided for a front-transverse drive.

In FIG. 3, the transmission is designated with 201, a transmission input shaft with 204, a transmission output shaft, which is arranged axially parallel to the transmission input shaft 204, with 260. The transmission input shaft 204 is actively connected to the drive motor M of the transmission 201, for example in the well-known manner via a hydrodynamic torque converter, the transmission input shaft 204 is connected to the pump impeller wheel of this torque converter in this case. An oil pump 206 provided for supplying oil to the transmission and arranged on the side 220 of the transmission 201 opposite the drive motor M and can be configured, for example as a compact vane pump or as an axially narrow ring gear pump. The pump housing is designated with 208.

In FIG. 3, the oil pump 206 is driven by the drive motor of the transmission 201 (not shown in more detail). For this purpose, a pump input shaft 244 is provided, and is non-rotatably connected to the pump impeller wheel of the oil pump 206 and runs centrally through the full axial length. For this purpose, the transmission input shaft 204 is configured as a hollow shaft and encompasses the pump input shaft 244 co-axially. For example, if a hydrodynamic torque converter is provided in the power flow, between the drive motor and the transmission input shaft 204, the pump input shaft 244 is connected to the turbine wheel of this torque converter.

However, the oil pump 206 may also be driven by an electric motor 222, which is arranged co-axially to the transmission input shaft 204 and co-axially to the pump input shaft 244. The rotational speed and torque transmission from the electric motor 222 to the oil pump 206 operates similarly to the exemplary embodiment according to FIG. 1. The electric motor housing 218 encompassing the pump housing 208 is connected to the transmission housing in a rotationally fixed manner accommodates a stator 224 of the electric motor housing 222 in a rotationally fixed manner in FIG. 3, on the side of the oil pump 206 opposite the drive motor. A rotatably mounted rotor 228 of the electric motor 222 arranged centrally inside the stator 224 is actively connected to the driven pump impeller wheel of the oil pump 206 and/or to the pump input shaft 244 via an overrunning clutch 234. In another embodiment that is different from FIG. 3, it may for example be provided that the overrunning clutch be arranged in the power flow between the pump input shaft permanently connected to the transmission input shaft and the pump wheel of the oil pump and the electric motor rotor connected permanently to the pump impeller wheel of the oil pump.

REFERENCE NUMERALS 2 drive device
4 transmission input shaft
6 oil pump
8 pump housing
10 ring gear
12 installation space
14 front panel
16 mounting bolts
18 cover/electric motor housing
20 installation space
22 electric motor
24 stator
26 supply line
28 rotor
30 bearing
32 hub extension
34 overrunning clutch
36 hub sheath
40 sprocket wheel/belt pulley
104 transmission input shaft
106 oil pump
118 electric motor housing
122 electric motor
124 stator
128 rotor
132 hub extension
134 overruning clutch
136 hub sheath
140 sprocket wheel/belt pulley
142 chain/belt
144 pump input shaft
146 sprocket wheel/belt pulley
148 pump section
150 hydrodynamic torque converter
201 transmission
204 transmission input shaft
206 oil pump
208 pump housing
218 electric motor housing
222 electric motor
224 stator
228 rotor
234 overrunning clutch
244 pump input shaft
260 transmission output shaft

The invention claimed is:

1. A drive device for driving an oil pump of an automatic transmission of a motor vehicle, the oil pump (6) being coupled to a drive motor (M) via an overrunning clutch and a supplementary electric motor (22) being powered by a vehicle on-board power system, the electric motor (22) being co-axial to a transmission input shaft (4) outside of a pump housing (8) in a separate electric motor housing (18), and featuring an internal radial rotor (28), the electric motor (22) being connected to a driven ring gear (10) of the oil pump (6) arranged in the pump housing (8) such that the electric motor (22) and the driven ring gear (10) are rotationally fixed relative to each other, and the rotor (28) being rotatably mounted in the electric motor housing (18) and forming a hub extension (32) that encompasses the transmission input shaft (4), the rotor (28) being connected, in a rotationally fixed manner, to the driven ring gear (10) of the oil pump (6) via a mechanical drive connection and the rotor (28) being directly coupled to both the hub extension (32) and the overrunning clutch (34).

2. The drive device according to claim 1, wherein the hub extension (32) of the rotor (28) is directly coupled, via the rotor (28), to the overrunning clutch (34) which is directly coupled to a component (36) driven by the drive motor (M).

3. The drive device according to claim 2, wherein the hub extension (32) of the rotor (28) is coupled to a pump section of a hydrodynamic torque converter (TC), which is arranged between the drive motor (M) and the transmission.

4. The drive device according to claim 3, wherein a hub sheath (36), which extends into a region of the electric motor (22) and encompasses the transmission input shaft (4), is configured on the pump section of the hydrodynamic torque converter (TC), and the overrunning clutch (34) is directly coupled to the hub sheath (36) and, via the rotor (28), to the hub extension (32) of the rotor (28).

5. The drive device according to claim 1, wherein a stator (24) and the rotor (28) of the electric motor (22) are arranged inside a cover, which is arranged on a front panel (14) of the transmission and forms the electric motor housing (18).

6. A drive device for driving an oil pump of an automatic transmission of a motor vehicle, the oil pump (6) being coupled to a drive motor (M) via an overrunning clutch and a supplementary electric motor (22) being powered by a vehicle on-board power system, the electric motor (22) being co-axial to a transmission input shaft (4) outside of a pump housing (8) in a separate electric motor housing (18), the electric motor (22) comprising an internal radial rotor (28) which is directly, integrally coupled to a hub extension (32) that is supported coaxially with the transmission input shaft (4), the hub extension (32) being rotationally fixed to a driven ring gear (10) of the oil pump (6) that is arranged in the pump housing (8) such that the electric motor (22) and the driven ring gear (10) are rotationally fixed relative to each other, the rotor (28) being rotatably mounted within the electric motor housing (18) and directly, integrally coupled to the overrunning clutch (34),
wherein the oil pump (6) is a ring gear pump and is co-axial to the transmission input shaft (4) with the driven ring gear (10) and comprises the pump housing (8) axially adjacent to the electric motor housing (18) and the hub extension (32) of the rotor (28) extends, in a sealing manner, into the pump housing (8) via an opening of the pump housing (8), which encompasses the transmission input shaft (4) co-axially, and is connected in a rotationally fixed manner to the ring gear (10) of the oil pump (6) via a gearing.

7. A drive device for driving an oil pump of an automatic transmission of a motor vehicle, the oil pump (6) being coupled to a drive motor (M) via an overrunning clutch and a supplementary electric motor (22) being powered by a vehicle on-board power system, the electric motor (22) being co-axial to a transmission input shaft (4) outside of a pump housing (8) in a separate electric motor electric motor (22) comprising an internal radial rotor (28) which is directly, integrally coupled to a hub extension (32) that is supported coaxially with the transmission input shaft (4), the hub extension (32) being rotationally fixed to a driven ring gear (10) of the oil pump (6) that is arranged in the pump housing (8) such that the electric motor (22) and the driven ring gear (10) are rotationally fixed relative to each other, the rotor (28) being rotatably mounted within the electric motor housing (18) and directly, integrally coupled to the overrunning clutch (34), the oil pump is a vane pump and is co-axial to the transmission input shaft and comprises the pump housing adjacent to the electric motor housing and the hub extension of the rotor extends in a sealing manner into the pump housing via an opening of the pump housing, and is connected in a rotationally fixed manner to the ring gear of the oil pump via a gearing.

8. The drive device according to claim 7, wherein the vane pump is arranged on a side (220) of the transmission (201) opposite the drive motor (M).

9. The drive device according to claim 6, wherein the oil pump (6) is arranged inside a cover that forms the electric motor housing (18).

10. A drive device for driving an oil pump of an automatic transmission of a motor vehicle, the oil pump (6) being coupled to a drive motor (M) via an overrunning clutch and a supplementary electric motor (22) being powered by a vehicle on-board power system, the electric motor (22) being co-axial to a transmission input shaft (4) outside of a pump housing (8) in a separate electric motor housing (18), the electric motor (22) comprising an internal radial rotor (28) which is directly, integrally coupled to a hub extension (32) that is supported coaxially with the transmission input shaft (4), the hub extension (32) being rotationally fixed to a driven ring gear (10) of the oil pump (6) that is arranged in the pump housing (8) such that the electric motor (22) and the driven ring gear (10) are rotationally fixed relative to each other, the rotor (28) being rotatably mounted within the electric motor housing (18) and directly, integrally coupled to the overrunning clutch (34),
wherein the oil pump is a vane pump having the driven ring gear and is co-axial to the transmission input shaft, the oil pump is arranged on a side (220) of the transmission (201) opposite the drive motor (M), and the electric motor, which is connected to the ring gear of the vane pump, is arranged on a side of the transmission facing the drive motor (M).

11. A drive device for driving an oil pump of an automatic transmission of a motor vehicle, the oil pump (106) being coupled to a drive motor (M) via an overrunning clutch and a supplementary electric motor (122) being powered by a vehicle on-board power system, the electric motor (122) being co-axial to a transmission input shaft (104) outside of a pump housing in a separate housing (118), the electric motor 122 comprising an internal radial rotor (128) which is directly, integrally coupled to a hub extension (132) that is supported coaxially with the transmission input shaft (104), the rotor (128) being rotatably supported within the electric motor housing (118) and directly, integrally coupled to a hub sheath (136) via the overrunning clutch (134), the oil pump (106) comprises a pump input shaft (144) that is axially parallel to the transmission input shaft (104) and projects from the pump housing, and the hub extension (132) of the rotor (128) is connected to the pump input shaft (144) in a rotationally fixed manner by way of a gearset.

12. The drive device according to claim 11, wherein the oil pump (106) is arranged inside a cover that forms the electric motor housing (118).

13. The drive device according to claim 12, wherein the oil pump (106) is arranged inside a front panel (14) of the transmission.

14. An assembly for driving an oil pump of a motor vehicle having an automatic transmission, the assembly comprising:
the oil pump (6) being housed within a pump housing (8) and including a ring gear (10) and being coupled to a drive motor (M) via an overrunning clutch (34);
an electric motor (22) being housed within an electric motor housing (18) and including a rotor (28) and a stator (24) and the electric motor (22) being coupled to an electric supply, the electric motor housing (18) being exterior to the pump housing (8) and the rotor (28) being directly rigidly fixed to a hub extension (32) that extends radially inward and axially away from the electric motor housing (18) through the pump housing (8) and is connected to the ring gear (10) of the oil pump (6) in a rotationally fixed manner, the rotor (28) and the hub extension (32) being coaxial with a transmission input shaft (4), which coaxially extends through the hub extension (32) and the rotor (28) being directly fixed to the overrunning clutch (34) which is directly fixed to a hub sheath (36) that is coupled to the drive motor (M); and the oil pump (6) being exclusively driven by the electrical motor (22) when the overrunning clutch (34) disengages communication between the rotor (28) and the drive motor and when electrical energy is supplied to the electrical motor (22), the hub extension (32) being supported on the hub sheath (36) by a bearing (30) such that the hub extension (32) is rotatable with respect to the hub sheath (36) when the overrunning clutch (34) disengages communication between the rotor (28) and the drive motor, and the oil pump (6) being driven by the drive motor when the overrunning clutch (34) engages the rotor (28) with the drive motor.

* * * * *